United States Patent [19]

Sakakibara et al.

[11] Patent Number: 4,633,736
[45] Date of Patent: Jan. 6, 1987

[54] VEHICULAR CONTINUOUSLY VARIABLE TRANSMISSION

[75] Inventors: Shiro Sakakibara, Toyokawa; Mutsumi Kawamoto, Nagoya; Masahiko Ando, Anjo, all of Japan

[73] Assignee: Aisin-Warner Kabushiki Kaisha, Anjo, Japan

[21] Appl. No.: 798,724

[22] Filed: Nov. 18, 1985

Related U.S. Application Data

[63] Continuation of Ser. No. 446,953, Dec. 6, 1982, abandoned.

[51] Int. Cl.⁴ ...................... F16H 37/00; F16H 47/04
[52] U.S. Cl. .......................................... 74/689; 74/677
[58] Field of Search ........................ 74/689, 695, 677

[56] References Cited

U.S. PATENT DOCUMENTS

| | | | |
|---|---|---|---|
| 2,869,398 | 1/1959 | DeForrd | 74/677 |
| 2,969,694 | 1/1961 | Harmon et al. | 74/677 |
| 3,021,727 | 2/1962 | Kelley et al. | 74/677 |
| 4,140,029 | 2/1979 | Lee | 74/677 X |
| 4,342,238 | 8/1982 | Gardner | 74/689 |
| 4,393,731 | 7/1983 | Croswhite et al. | 74/689 |

FOREIGN PATENT DOCUMENTS

| | | | |
|---|---|---|---|
| 653589 | 11/1935 | Fed. Rep. of Germany | 74/677 |
| 1937342 | 2/1971 | Fed. Rep. of Germany | 74/677 |
| 0047168 | 4/1977 | Japan | 74/677 |
| 218243 | 11/1941 | Switzerland | 74/677 |

Primary Examiner—Lawrence Staab
Assistant Examiner—Dirk Wright
Attorney, Agent, or Firm—Cooper, Dunham, Griffin & Moran

[57] ABSTRACT

A vehicular continuously variable transmission comprising a V-belt drive continuously variable transmission and a power transmission splitting driving mechanism consisting of a combination of a fluid coupling and a planetary gearing and disposed between the output shaft of the continuously variable transmission of the vehicle and the V-belt drive continuously variable transmission.

4 Claims, 4 Drawing Figures

VEHICULAR CONTINUOUSLY VARIABLE TRANSMISSION

This is a continuation of application Ser. No. 446,953, filed Dec. 6, 1982.

BACKGROUND OF THE INVENTION

1. Field of the Invention

This invention relates to a vehicular continuously variable transmission employing a V-belt drive continuously variable transmission.

2. Description of the Rrior Art

A V-belt drive continuously variable transmission is applied to a vehicular continuously variable transmission in combination with a fluid coupling, such as a hydraulic torque converter, and a forward-reverse shifting mechanism. When a fluid coupling is disposed before the V-belt drive continuously variable transmission in such a vehicular continuously variable transmission, there arise problems that the down-shift operation of the V-belt drive continuously variable transmission is difficult if the rotation of the pulleys is interrupted before the V-belt drive continuously variable transmission is shifted down to the maximum reduction ratio when the vehicle is stopped suddenly and that shocks and vibrations are produced due to abrupt shift-down operation in starting the vehicle again, if the V-belt drive continuously variable transmission has not completely been shifted down. On the other hand, a transmission system including a fluid coupling disposed on the output side of the V-belt drive continuously variable transmission allows the pulleys of the V-belt drive continuously variable transmission to turn even after the vehicle has been stopped, therefore, the V-belt drive continuously variable transmission can be shifted down surely to the maximum torque ratio and the drastic slip of the V-belt can be prevented, which is advantageous in respect of improving the durability of the V-belt. However, such a transmission system has a disadvantage that the transmission system is inevitably large in size and hence is difficult to be installed in the engine room of the vehicle, as a fluid coupling of an increased capacity is required.

SUMMARY OF THE INVENTION

Accordingly, an object of the present invention is to provide a vehicular continuously variable transmission comprising a fluid coupling of a reduced torque capacity disposed on the output side of a V-belt drive continuously variable transmission and thus capable of employing a fluid coupling of a reduced size.

Further object of the present invention is to provide a vehicular continuously variable transmission capable of transmitting part of the torque directly without the agency of fluid means and hence capable of operating at higher power transmitting efficiency as compared with that attainable in torque transmission employing a hydraulic torque converter or a fluid coupling and also at a slip factor of a fluid coupling decreases with the increase of the operating speed, and capable of reducing the fuel consumption sithout employing a lock-up mechanism in steady running at a high or medium speed.

Still further object of the present invention is to provide a vehicular continuously variable transmission comprising a combination of a V-belt drive continuously variable transmission and a power transmission splitting driving mechanism disposed between the V-belt drive continuously variable transmission and the output shaft.

BRIEF DESCRIPTION OF THE DRAWINGS

FIGS. 3-1 to 3-12 and FIGS. 4-1 to 4-12 are schematic illustrations of the exemplary layouts of a power transmission splitting driving mechanism (splitting coupling) according to the present invention.

DESCRIPTION OF THE PREFERRED EMBODIMENTS

Figure 1:
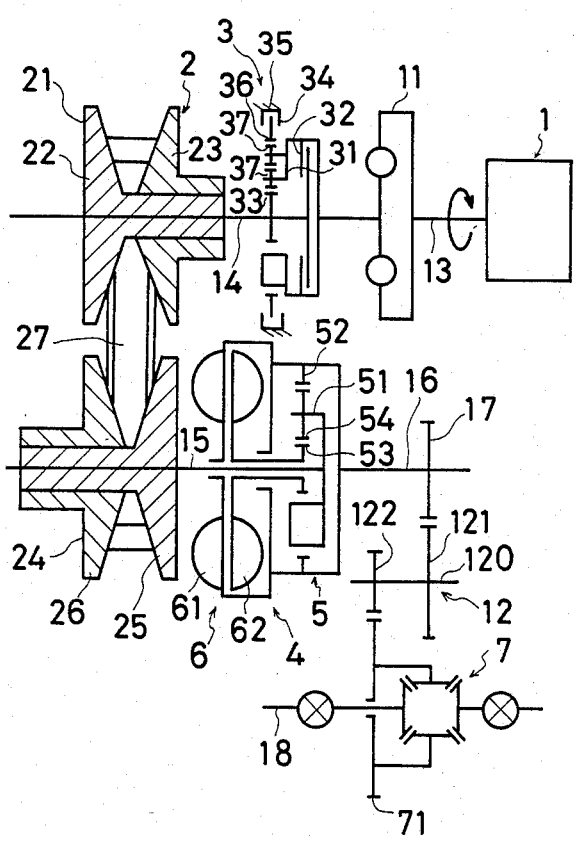
FIG. 1 is a schematic illustration of a power transmitting system employing an embodiment of a power transmission splitting driving mechanism (splitting coupling) according to the present invention.

There are shown an engine 1, a V-belt drive continuously variable transmission 2, a forward-reverse shifting planetary transmission 3 interposed between the engine 1 and the V-belt drive continuously variable transmission 2, a power transmission splitting driving mechanism (referred to as "splitting coupling" hereinafter) 4 connected to the output end of the V-belt drive continuously variable transmission and consisting of a combination of planetary gearing 5 and a fluid coupling 6, a differential gear 7 interposed between the splitting coupling 4 and the axle 18 of the vehicle, a damper 11 interposed between the engine 1 and the planetary transmission 3, and an idler gear 12 interposed between the splitting coupling and the differential gear 7 in parallel to the splitting coupling and comprising a shaft 120 and input gear 121 and an output gear 122 secured to the opposite ends of the shaft 120.

The planetary transmission 3 comprises a carrier 31 connected to the output shaft 13 of the engine 1 through the damper 11, a sun gear 33 connected to the carrier 31 through a multiple disc clutch 32 and also to the input shaft 14 of the V-belt drive continuously variable transmission 2, a ring gear 36 engageable with a transmission case 35 through a multiple disc brake 34 and planetary pinion 37 meshed with the sun gear 33 and the ring gear 36.

The V-belt drive continuously variable transmission 2 comprises an input shieve 21 mounted on the input shaft 14 and including a fixed flange 22 fixed to the input shaft 14 and a movable flange 23 adapted to be operated hydraulically, an output shieve 24 mounted on the output shaft 15 of the V-belt drive continuously variable transmission in parallel to the input shaft 14 and including a fixed flange 25 fixed to the output shaft 15 and a movable flange 26 adapted to be operated hydraulically and a V-belt 27 for transmitting power between the input shieve 21 and the output shieve 24. The splitting coupling 4 comprises a planetary gearing comprising a carrier 51 connected to the output shaft of the V-belt drive continuously variable transmission, a ring gear 52 connected to the output shaft 16 of the splitting oupling and to the turbine 61 of the fluid coupling, a sun gear 53 connected to the pump 62 of the fluid coupling and a planetary pinion 54 rotatably supported on the carrier 51 and meshed with the ring gear 52 and the sun gear 53, and a fluid coupling 6 comprising the turbine 61 and the pump 62. An output gear 17 meshed with the input gear 121 of the idler gear is attached to the output shaft 16 of the splitting coupling 4. The output gear 122 of the idler gear is meshed with the ring gear 71 of the differential gear 7. In this vehicular continuously variable transmission, the splitting coupling 4 transmits part of the torque to the output shaft 16 through the planetary pinion 54 and the ring gear 52, while the rest of the torque is transmitted to the output shaft 16 through the sun gear 53 and the fluid coupling 6. Thus the power loss inherent in power transmission through a fluid coupling by the agency of a fluid medium occurs only with the partial torque transmitted through the fluid coupling 6, while such power loss due to power transmission through a fluid coupling will not occur with the partial torque transmitted directly from the ring gear 52 to the output shaft 16, so that improved power transmitting efficiency results. Furthermore, since only part of the total torque is allotted to the fluid coupling 6, a fluid coupling of a reduced torque capacity can be applied as the fluid coupling 6 of this system. Consequently, a large torque can be transmitted even if a fluid coupling of a reduced external dimensions is employed with the result that a compact vehicular continuously variable transmission can be provided. Furthermore, since the input shaft 15 of the splitting coupling is allowed to continue to rotate owing to the slipping operation of the fluid coupling after the vehicle has suddenly been stopped and the output shaft 16 of the splitting coupling has been stopped, the V-belt drive continuously variable transmission 2 is allowed to rotate for a time sufficient to be shifted down to the maximum torque ratio, therefore, the vehicle can be started again smoothly with the transmission system shifted down to the maximum torque ratio. Still further, since the slip factor of a fluid coupling decreases with the increase of the operating speed and since part of the total torque is transmitted through the fluid coupling, high power transmitting efficiency is achievable and improvement of the fuel consumption is possible in steady running at a high or medium speed without using a direct coupling clutch (a lock-up clutch).

Figure 2:
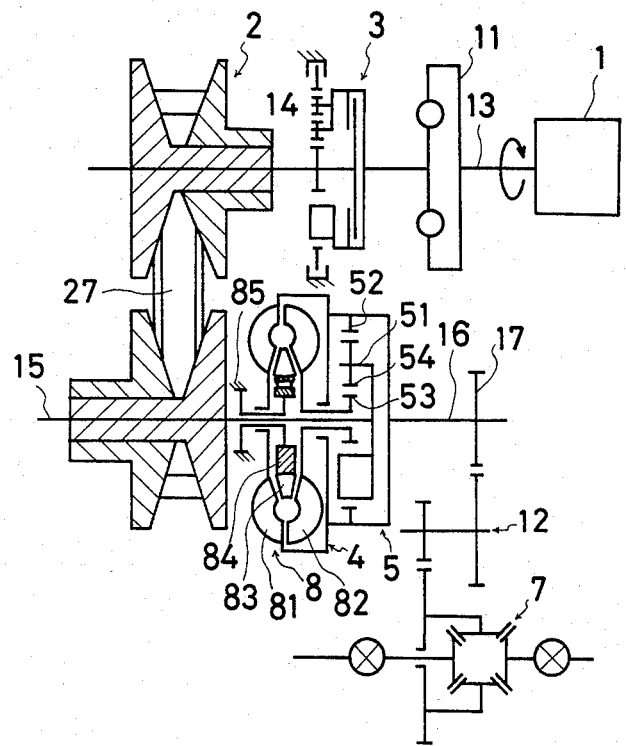
FIG. 2 is a schematic illustration of a power transmitting system employing another embodiment of a power transmission splitting driving mechanism (splitting coupling) according to the present invention.
Figure 3:
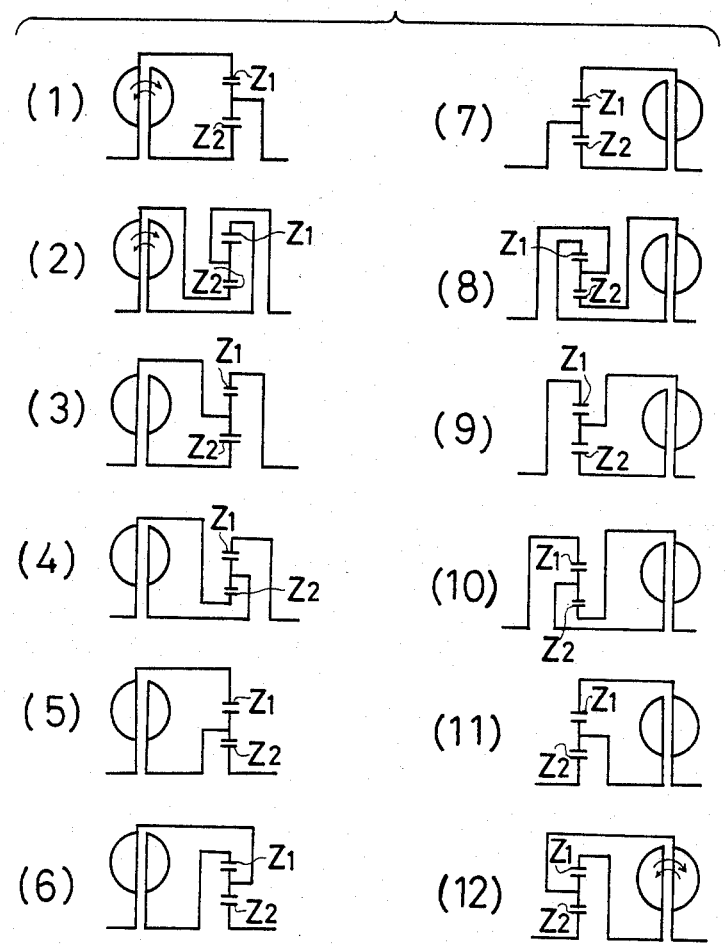

FIG. 2 shows another embodiment of the present invention, in which a hydraulic torque converter 8 is employed in the splitting coupling 4. The hydraulic torque converter 8 includes a turbine 81 connected to the ring gear 52 and to the output shaft of the splitting coupling, a pump 82 connected to the sun gear 53 and a stator 83 connected to a fixed member 85 through a one-way clutch 84. This embodiment provides the same effects as the first embodiment does.

The output shaft of the V-belt drive continuously variable transmission and the planetary gearing 5 of the splitting coupling may be connected by the sun gear or the ring gear instead of with the carrier. Various methods as described below are applicable to connecting the fluid coupling 6 and the planetary gearing. The power may be transmitted from the output shaft of the V-belt drive continuously variable transmission to the planetary gearing through the fluid coupling.

Figure 4:
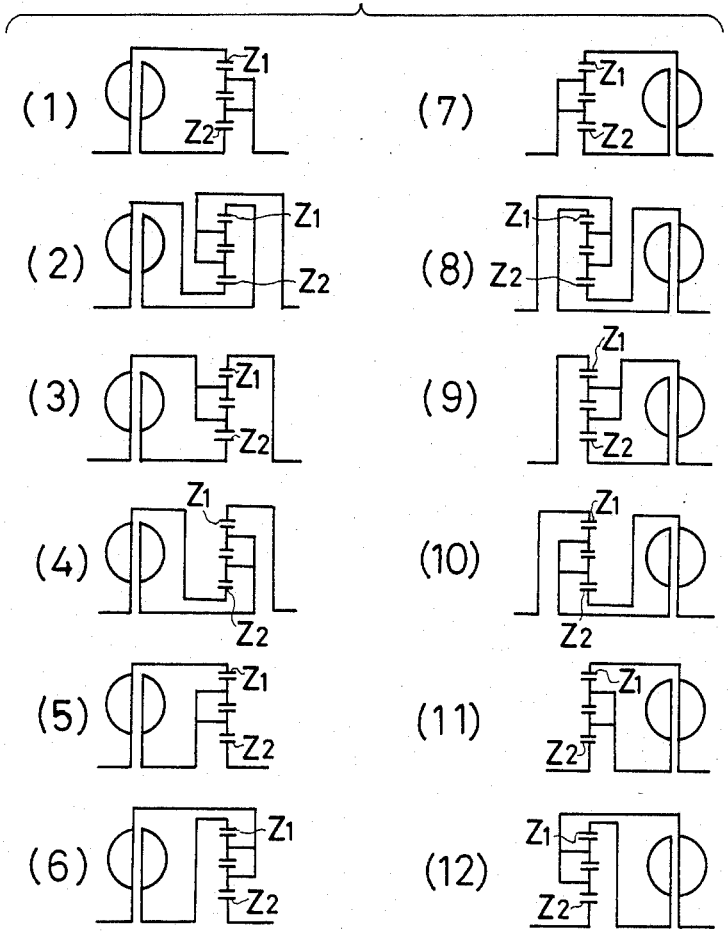

FIGS. 3-1 to 3-6 show various exemplary layouts of the connection between the V-belt drive continuously variable transmission and the slipping coupling, in which the output shaft of the V-belt drive continuously variable transmission is connected to the pump of the fluid coupling and the output shaft of the splitting coupling is connected to the component of the planetary gearing. FIGS. 3-1 and 3-2, FIGS. 3-3 and 3-4 and FIGS. 3-5 and 3-6 show carrier output system, ring gear output system and sun gear output system, respectively. FIGS. 3-7 to 3-12 show various exemplary layouts of the connection between the V-belt drive continuously variable transmission and the slipping coupling, in which the output shaft of the V-belt drive continuously variable transmission is connected to the component of the planetary gearing, while the turbine of the fluid coupling is connected to the output shaft of the slipping coupling. FIGS. 3-7 and 3-8, FIGS. 3-9 and 3-10 and FIGS. 3-11 and 3-12 show carrier input system, ring gear input system and sun gear input system, respectively. Torque distribution ratio x for fluid coupling in each one of the systems shown in FIGS. 3-1 to 3-12 is shown as a function of the number of teeth $Z_1$ of the ring gear and the number of teeth $Z_2$ of the sun gear in Table 1, in which columns (1) to (12) correspond to the systems of FIGS. 3-1 to 3-12. Numerical values in Table 1 are the torque distribution ratios given by substituting $Z_1=73$ and $Z_2=33$ into the equations shown in Table 1. FIGS. 4-1 to 4-2 are the same layouts as those of FIGS. 3-1 to 3-12, except that a double planetary gearing is employed. Torque distribution ratio x for the fluid coupling in each one of the systems shown in FIGS. 4-1 to 4-12 is shown as a function of the number of teeth $Z_1$ of the ring gear and the number of teeth $Z_2$ of the sun gear in Table 2, in which the columns (1) to (12) corresponds to the systems of FIGS. 4-1 to 4-12. Numerical values in Table 2 are the torque distribution ratios given by substituting $Z_1=73$ and $Z_2=35$ into the equations shown in Table 2.

Thus a desired ratio of the torque transmitted through the fluid coupling to the total torque can be determined by selectively employing an appropriate layout in compliance with the purpose and the type of the vehicle so that the facility in installing the transmission system and the fuel consumption can be improved.

TABLE 1

Torque distribution ratio for fluid coupling ($Z_1 = 73, Z_2 = 33$)

| | | |
|---|---|---|
| $1 \quad X = \dfrac{Z_2}{Z_1 + Z_2} = 0.311$ | $5 \quad X = \dfrac{Z_1 + Z_2}{Z_2} = 3.212$ | $9 \quad X = \dfrac{Z_2}{Z_1} = -0.452$ |
| $2 \quad X = \dfrac{Z_2}{Z_1 + Z_2} = 0.689$ | $6 \quad X = -\dfrac{Z_1}{Z_2} = -2.212$ | $10 \quad X = \dfrac{Z_1 + Z_2}{Z_1} = 1.452$ |
| $3 \quad X = -\dfrac{Z_1}{Z_2} = -0.452$ | $7 \quad X = \dfrac{Z_2}{Z_1 + Z_2} = 0.311$ | $11 \quad X = \dfrac{Z_1 + Z_2}{Z_2} = 3.212$ |
| $4 \quad X = \dfrac{Z_1 + Z_2}{Z_1} = 1.452$ | $8 \quad X = \dfrac{Z_1}{Z_1 + Z_2} = 0.689$ | $12 \quad X = -\dfrac{Z_1}{Z_2} = -2.212$ |

TABLE 2

Torque distribution ratio for fluid coupling
($Z_1 = 73$, $Z_2 = 35$)

| | | |
|---|---|---|
| $1\ X = \dfrac{Z_2}{Z_2 - Z_1} = 0.921$ | $5\ X = \dfrac{Z_2 - Z_1}{Z_2} = 1.086$ | $9\ X = \dfrac{Z_2}{Z_1} = 0.479$ |
| $2\ X = \dfrac{Z_1}{Z_1 - Z_2} = 1.921$ | $6\ X = \dfrac{Z_1}{Z_2} = 2.086$ | $10\ X = \dfrac{Z_1 - Z_2}{Z_1} = 0.521$ |
| $3\ X = -\dfrac{Z_2}{Z_1} = 0.479$ | $7\ X = \dfrac{Z_2}{Z_2 - Z_1} = -0.921$ | $11\ X = \dfrac{Z_2 - Z_1}{Z_2} = -1.086$ |
| $4\ X = \dfrac{Z_1 - Z_2}{Z_1} = 0.521$ | $8\ X = \dfrac{Z_1}{Z_1 - Z_2} = 1.921$ | $12\ X = -\dfrac{Z_1}{Z_2} = 2.086$ |

As described hereinbefore, the vehicular continuously variable transmission of the present invention comprises a V-belt drive continuously variable transmission and a power transmission splitting driving mechanism (splitting coupling) formed of a combination of a fluid coupling and a planetary gearing and disposed between the V-belt continuously variable transmission and the output shaft of the vehicular continuously variable transmission and the fluid coupling is disposed on the output side of the V-belt drive continuously variable transmission, therefore, the fluid coupling is charged with a reduced torque so that a fluid coupling of a reduced size is applicable, the pwer efficiency is improved as compared with a transmission employing a fluid coupling, such as a hydraulic torque converter, as part of the total torque is transmitted without the agency of a fluid, the slip factor of a fluid coupling decreases with the increase of the operating speed and the fuel consumption in steady running at a high or medium speed can be improved without using a lock-up mechanism.

We claim:

1. A vehicular continuously variable transmission comprising a V-belt drive continuously variable transmission and a power transmission splitting driving mechanism formed of a combination of a fluid coupling and a planetary gearing and disposed between the V-belt drive continuously variable transmission and an output shaft of a power transmission splitting driving mechanism of the vehicular continuously variable transmission, wherein said V-belt drive continuously variable transmission including a fixed flange fixed to the input shaft and a movable flange adapted to be operated hydraulically, an output sheave mounted on the output shaft of the V-belt drive continuously variable transmission in parallel to the input shaft and including a fixed flange fixed to the output shaft and a movable flange adapted to be operated hydraulically and a V-belt for transmitting power between the input sheave and the output sheave, and said fluid coupling having a pump and a turbine, and said planetary gearing including a sun gear, a ring gear, and a carrier, and said planetary gearing connecting the carrier to the output shaft of said V-belt drive continuously variable transmission, while connecting the sun gear to the pump, while still connecting the ring gear to the turbine.

2. A vehicular continuously variable transmission according to claim 1 wherein said forward-reverse shifting planetary transmission is mounted on the input shaft.

3. A vehicular continuously variable transmission according to claim 1 wherein said fluid coupling is a 2-member fluid coupling.

4. A vehicular continuously variable transmission according to claim 1 wherein said fluid coupling is a hydraulic torque converter.

* * * * *